(12) United States Patent
Miller

(10) Patent No.: US 7,974,079 B2
(45) Date of Patent: Jul. 5, 2011

(54) INTEGRATED MOUNTING SYSTEM FOR COMMUNICATION AND SURVEILLANCE INFRASTRUCTURES

(75) Inventor: Landon Miller, Tuscaloosa, AL (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 12/140,906

(22) Filed: Jun. 17, 2008

(65) Prior Publication Data

US 2009/0310286 A1 Dec. 17, 2009

(51) Int. Cl.
*H05K 7/20* (2006.01)

(52) U.S. Cl. .............. 361/679.01; 361/679.02; 361/724; 361/725; 248/235; 135/88.13

(58) Field of Classification Search ........................ None
See application file for complete search history.

(56) References Cited

U.S. PATENT DOCUMENTS

| | | | | |
|---|---|---|---|---|
| 3,699,235 | A * | 10/1972 | Wasson et al. ................. | 174/494 |
| 3,931,452 | A * | 1/1976 | Nilsson ......................... | 174/491 |
| 5,125,608 | A * | 6/1992 | McMaster et al. .......... | 248/163.1 |
| 5,798,482 | A * | 8/1998 | Reeves ............................... | 174/2 |
| 5,816,443 | A * | 10/1998 | Bustos .......................... | 221/211 |
| 5,859,762 | A | 1/1999 | Clark et al. | |
| 6,111,189 | A * | 8/2000 | Garvison et al. ............. | 136/244 |
| 6,350,135 | B1 * | 2/2002 | Acklin et al. ................. | 439/211 |
| 6,397,869 | B1 * | 6/2002 | Jennings ........................... | 135/93 |
| 6,531,656 | B1 * | 3/2003 | Grote et al. ................... | 174/491 |
| 6,535,382 | B2 * | 3/2003 | Bishop et al. ................. | 361/690 |
| 6,675,934 | B1 * | 1/2004 | McCormick ................... | 182/129 |
| 7,230,819 | B2 * | 6/2007 | Muchow et al. .............. | 361/601 |
| 7,285,719 | B2 * | 10/2007 | Conger .......................... | 136/245 |
| 7,302,775 | B2 * | 12/2007 | Olmsted .......................... | 49/199 |
| 7,307,541 | B2 * | 12/2007 | Ikeda et al. ................. | 340/815.4 |
| 7,703,466 | B1 * | 4/2010 | Smith ............................ | 135/91 |
| 7,749,380 | B2 * | 7/2010 | Yungner et al. ............... | 210/143 |
| 7,756,667 | B2 * | 7/2010 | Hamann et al. ............... | 702/130 |
| 7,811,159 | B2 * | 10/2010 | Wilson et al. ................. | 454/119 |
| 2003/0036346 | A1 * | 2/2003 | Wilson et al. ................. | 454/119 |
| 2004/0222336 | A1 * | 11/2004 | Miller .......................... | 248/130 |
| 2005/0033515 | A1 * | 2/2005 | Bozzone ....................... | 701/214 |
| 2005/0257861 | A1 * | 11/2005 | Raos .............................. | 148/592 |
| 2006/0137348 | A1 * | 6/2006 | Pas ............................... | 60/641.1 |
| 2006/0232412 | A1 * | 10/2006 | Tabacman et al. ......... | 340/572.1 |
| 2006/0250755 | A1 * | 11/2006 | Tilton et al. ................... | 361/600 |
| 2007/0134058 | A1 * | 6/2007 | Meyer et al. ................. | 403/169 |
| 2007/0209694 | A1 * | 9/2007 | Gooch et al. ................... | 135/91 |
| 2008/0068782 | A1 * | 3/2008 | Muchow et al. ............. | 361/601 |
| 2008/0155915 | A1 * | 7/2008 | Howe et al. ................. | 52/220.3 |
| 2008/0197664 | A1 * | 8/2008 | Lowry et al. ............. | 296/100.18 |
| 2008/0197702 | A1 * | 8/2008 | Banach ........................... | 307/11 |

* cited by examiner

*Primary Examiner* — Jayprakash N Gandhi
*Assistant Examiner* — Anthony Q Edwards
(74) *Attorney, Agent, or Firm* — Dillon & Yudell LLP

(57) ABSTRACT

An integrated mounting system for communication and surveillance infrastructures includes a gantry, a system cabinet, and an interconnecting conduit. The gantry includes a frame configured for housing functional devices (e.g., antennas, video cameras, sensors, photovoltaic panels, and the like) and supporting posts. The system cabinet contains electronic equipment of the functional devices and provides connectivity to land data networks and external sources of power. The system may be installed on a trailer and include autonomous sources of power.

20 Claims, 2 Drawing Sheets

INTEGRATED MOUNTING SYSTEM FOR COMMUNICATION AND SURVEILLANCE INFRASTRUCTURES

CROSS REFERENCE TO RELATED APPLICATION

This application relates to commonly assigned U.S. patent application Ser. No. 12/140,897, filed concurrently herewith and titled "Integrated Mounting System For Communication And Surveillance Infrastructures." The contents of which is incorporated herein by reference in its entirety.

BACKGROUND

1. Technical Field

The present invention generally relates to communication and surveillance infrastructures and, in particular, to techniques for providing access points and gateways to communication and surveillance infrastructures.

2. Description of the Related Art

Growing number and complexity of installations for networked communication and surveillance infrastructures have lead to a need in development of automatically operable semistationary and mobile field access points and gateways to these infrastructures.

Typically, access points and gateways adapted for installation in urban and countryside environments function within a framework of a single communication or surveillance network or a small number of such networks, which limits their effectiveness and increases operating and maintenance costs. Therefore, further improvements in the development of access points and gateways to communication and surveillance infrastructures are desirable.

SUMMARY OF ILLUSTRATIVE EMBODIMENTS

Disclosed is an integrated mounting system, which may be used in communication and surveillance infrastructures as a semi-permanent, temporary, and movable access point, gateway, terminal, or server for urban and countryside installations.

In embodiments of the present invention, the integrated mounting system comprises a gantry, a system cabinet, and an interconnecting conduit. The gantry includes a frame and posts, which support the frame in a pre-selected position. The frame is configured for housing functional devices, such as antennas, cameras, sensors and/or photovoltaic panels of various communicating, surveillance, and solar systems and apparatuses. The system cabinet generally contains electronic equipment of the functional devices, auxiliary subsystems (e.g., cooler, heater, etc.), and means of connectivity to land data networks and external sources of power. The conduit couples the electronic equipment to the functional devices and propagates through elements of the gantry. The system may be installed on a transportation platform (e.g., trailer) and include an autonomous source of electric power.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
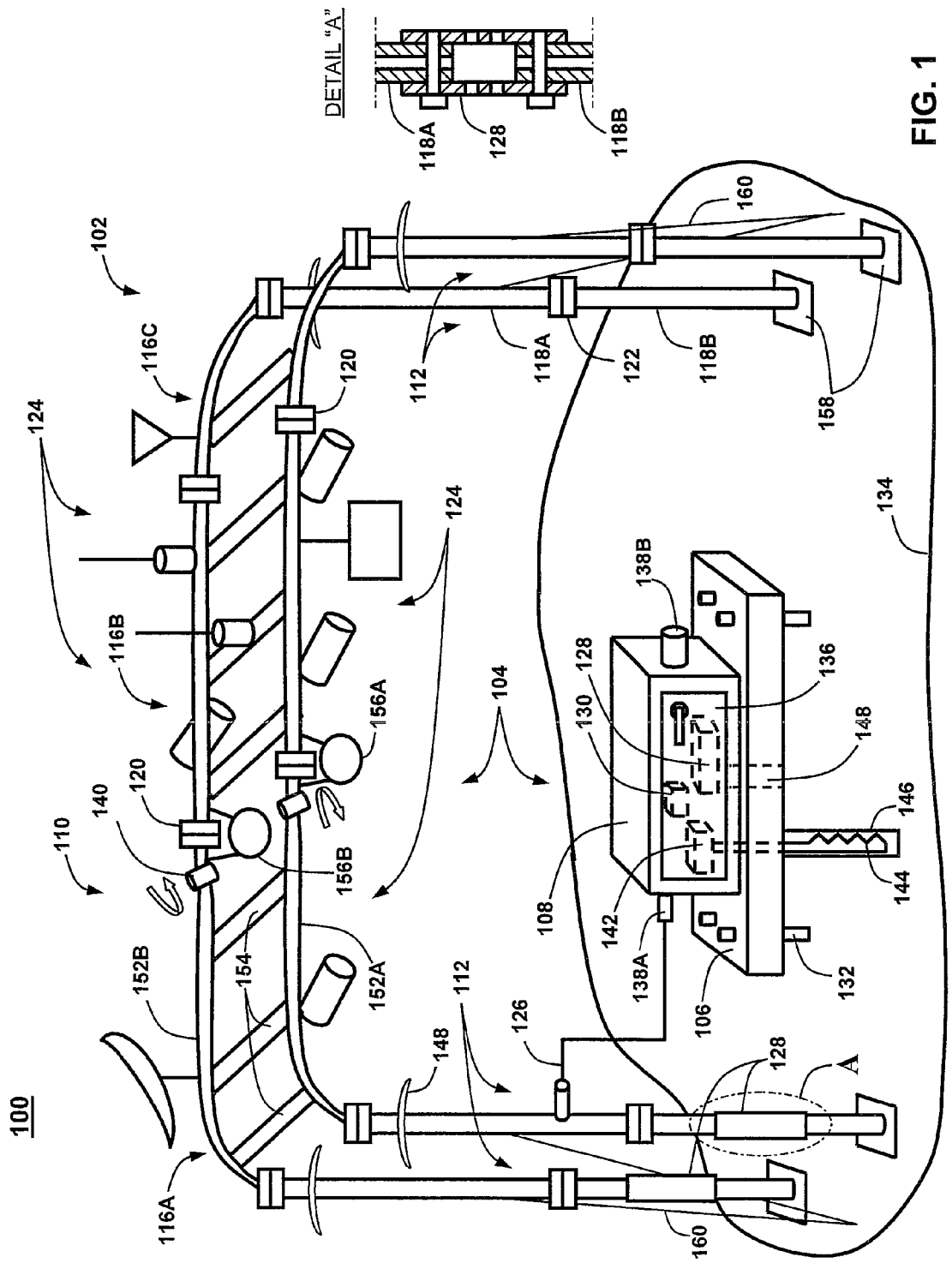
FIG. 1 depicts an integrated mounting system for communication and surveillance infrastructures, according to one embodiment of the invention.

The illustrative embodiments provide an integrated mounting system for communication and surveillance infrastructures, in which the system may be used as a semi-permanent, temporary, and movable access point, gateway, terminal, or server.

In the following detailed description of exemplary embodiments of the invention, specific exemplary embodiments in which the invention may be practiced are described in sufficient detail to enable those skilled in the art to practice the invention, and it is to be understood that other embodiments may be utilized and that mechanical, electrical, and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s), except that suffixes may be added, when appropriate, to differentiate such elements. The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. Specifically, as utilized herein, the terms "functional devices" and "electronic equipment" broadly refer to electronic, wireless, and opto-electronic devices at least in part implementing communication and surveillance functions and operating within a framework of respective networks or independent therefrom.

With reference now to the figures, FIG. 1 depicts an exemplary integrated mounting system (IMS) 100 for urban and countryside installations according to one embodiment of the invention. IMS 100 generally includes gantry 102 and electronic equipment 104 and may be configured for automatic operation within a plurality of communication and/or surveillance infrastructures. In some embodiments (not shown), IMS system 100 may additionally include an optional autonomous source of electric power.

In one embodiment, gantry 102 comprises frame 110 and a plurality of posts 112 (four posts 112 are shown), and electronic equipment 104 includes system cabinet 108, functional devices 124 disposed on frame 110, and conduit 126 interconnecting electronic components disposed in system cabinet 108 and functional devices 124.

Frame 110 may include one or more modules 116 (modules 116A-116C are shown), which are detachably connected to one another and to posts 112. Each module 116 generally includes arms 152 (arms 152A, 152B shown in module 116A) and a plurality of spaced apart shoulders 154, which are connected to arms 152 in a fixed or detachable relationship.

Correspondingly, posts 112 may be unitary elements or comprise sections 118 (sections 118A and 118B are shown), which are detachably connected to one another. Illustratively, modules 116 and sections 118 are interconnected using flanges 120 and 122, however, other types of couplings between modules 116 and sections 118 (for example, clamps) may be used in gantry 102.

Sections 118 may be connected to one another in a fixed or length-adjustable relationship. In one exemplary embodiment, lengths of a portion of posts 112 are adjusted using sliding (or, alternatively, helical) couplings 128. Illustratively, bottom sections 118 are provided with mounting shoes 158. During an on-ground installation of gantry 102, shoes 158 may be placed onto or be embedded in underlying foundation 134 (e.g., ground, gravel, concrete, etc.).

Some modules 116 may include joint couplings 140 that allow rotational movements of portions of IMS 100 relative to one another. For example, after disconnecting one of flanges 120 between modules 116A and 116B, a portion of gantry 102 including modules 116B and 116C and two posts 112 attached thereto may be rotated, about an axis of opposing joint coupling 140, relative to the other portion of gantry 102.

In exemplary embodiments, members of frame 110 and posts 112 thereof may be formed using, for example, pre-formed tubes having round or square cross-sections, T-shapes, I-beams, angle profiles, and the like structural elements fabricated from metals, fiberglass, composites, plastics, and combinations thereof.

Gantry 102 may also include (not shown) seals, gaskets, and covers adapted for preventing interior of the gantry from ingress of moisture or water, fixtures preventing unauthorized access to components of electronic equipment 104 or preventing climbing on posts 112 (anti-climbing dishes 148 are shown), as well as members adapted for securing and stabilizing gantry 102 (e.g., guy cables 160), and the like auxiliary elements and devices.

Electronic equipment 104 generally includes (i) transceivers, video/voice/data processors, networking adapters (all collectively denoted with a reference numeral 128) and external elements 124 thereof and (ii) power supplies, depleteable, rechargeable or fuel cell batteries, and other supporting apparatuses (all collectively denoted with a reference numeral 130).

External elements 124 of electronic equipment 104 are mounted on members of frame 110, and components 128 and 130 are disposed in system cabinet 108 and electrically connected to external elements 124 via conduit, or wiring, 126. For monitoring the location of IMS 100 and protecting equipment 104 from theft or damage, components of electronic equipment 104 and/or system cabinet 108 may be provided with radio-frequency identification (RFID) sensors and/or sensors and interlocks traceable via the Global Positioning System (GPS).

External elements 124 generally include antennas (e.g., cellular, Wi-Fi, microwave, phased arrays, satellite, ZigBee, etc. antennas), video cameras, infra-red cameras, motion detectors, RFID sensors, high-frequency generators and receivers, and the like functional components of electronic, wireless, optical, and opto-electronic communication/surveillance systems and apparatuses. External elements 124 may also include solar devices (e.g., photovoltaic panels), wind generators, fuel cells, and other electrical generating elements that can be used as main, supplemental, or backup sources of electric power for components of electronic equipment 104.

In one embodiment, system cabinet 108 is disposed proximate to gantry 102 and provided with a lockable door 136 and at least one port 138 used as an entry point for conduit 126 and other incoming/outgoing power and signal cables (ports 138A, 138B are shown). For receiving in-ground power and/or signal cables, optional port 148 may be disposed in a bottom portion of system cabinet 108.

System cabinet 108 is generally attached to and disposed on base plate 106 (for example, concrete, metal, or composite mounting plate), which is provided with fasteners 132 for affixing to underlying foundation 134 at a particular installation site. System cabinet 108 may include shelves, racks, guides, and the like elements providing mechanical support for the contents of the cabinet.

In the depicted embodiment, system cabinet 108 also comprises cooling unit 142 having heat-exchanging element 144 adapted for in-ground installation (as shown, in bore hole 146). In alternate embodiments, system cabinet 108 may include other auxiliary sub-systems, such as thermoelectric coolers, fans, heaters, thermostats, dehumidifiers, and other climate-controlling devices.

In one embodiment, conduit 126 extends from system cabinet 108, enters one of posts 112 (entry port 150 is shown) and propagates through openings in the post and members of modules 116 to reach, via arms 152 and shoulders 154 thereof, external elements 124 of electronic equipment 104. Generally, arms 152 and shoulders 154 are adapted for concealing and protecting branches of conduit 126. Portions of conduit 126 may also extend from arms 152 and form service loops 156.

IMS 100 may at least partially be assembled prior to an on-site installation. For example, firstly, sections frame 110 and posts 112 of gantry 102 may be connected together. Then, after cables and component wires and cables of conduit 126 are coupled to components 128 and 130 of electronic equipment 104 inside system cabinet 108, branches of conduit 126 are pulled through port 150, post 112, and arms 152 and shoulders 154 of frame 110 to mounting pads of external elements 124. Installation of IMS 100 is completed after attaching base plate 106 and posts 112 to foundation 134 and connecting system cabinet 108, via ports 138 and/or 148, to on-site power/signal cables.

Figure 2:
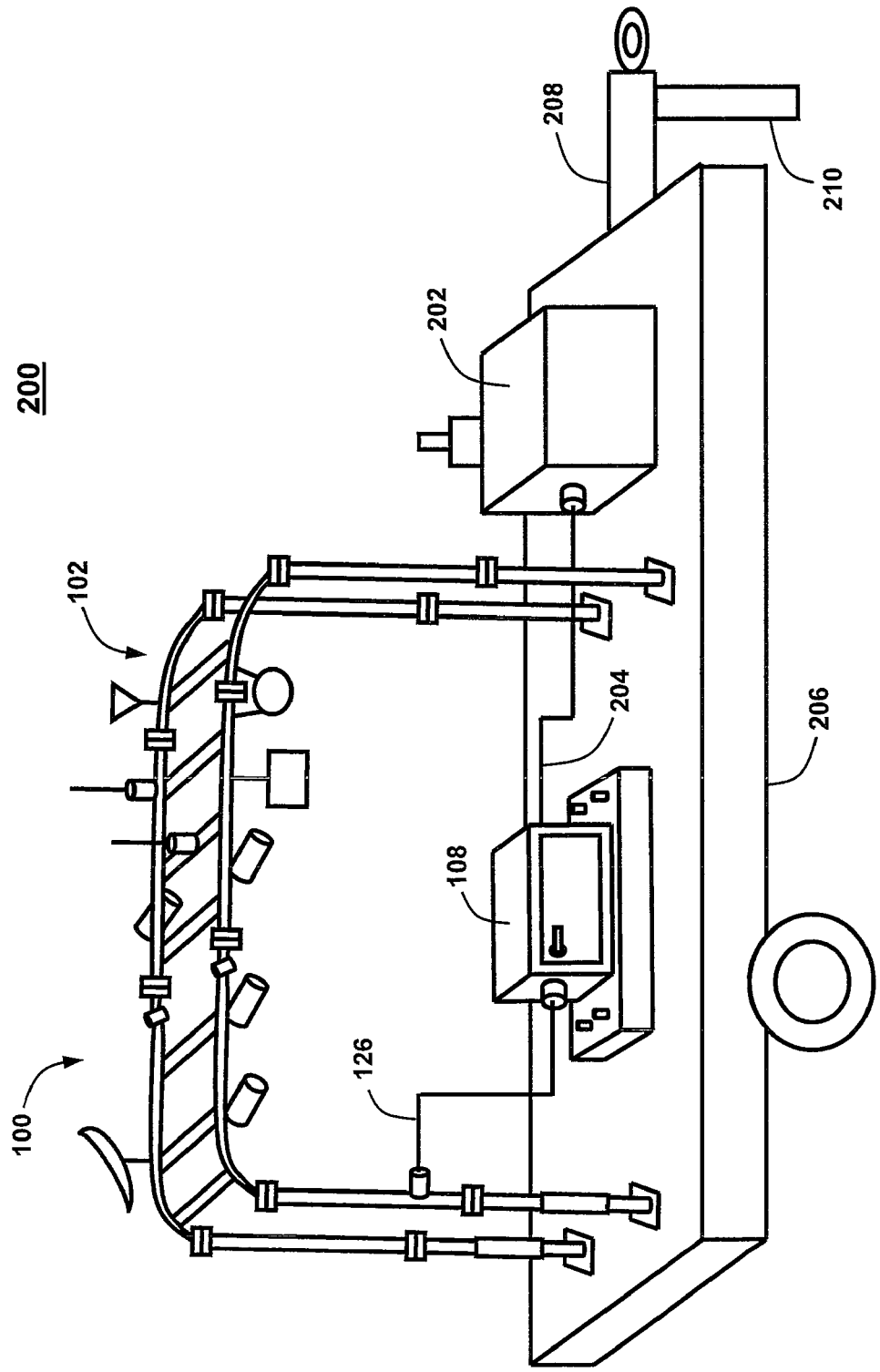
FIG. 2 depicts a transportable integrated mounting system for communication and surveillance infrastructures, according to another embodiment of the invention.

Referring to FIG. 2, in another embodiment of the invention, an exemplary transportable integrated mounting system (TIMS) 200 comprises IMS 100, optional electric power generator 202 coupled to IMS 100 via interconnecting cable 204, and transportation platform 206. IMS 100 and power generator 202 are attached to platform 206 and may be transported thereon by motorized vehicles, such as cars, trucks, or tractors.

Transportation platform 206 is generally a flat-bet trailer having hitch 208 for coupling to a transporting vehicle (not shown) and support 210, which is used to stabilize the platform during periods of on-site installations. Generally, IMS 100 is operational when platform 206 is in a stationary position, however, in some embodiments, at least a portion of the functions of IMS 100 may be enabled on moving transportation platform 206.

Power generator 202 is typically an autonomous source of electric power (e.g., diesel or gasoline engine/electric generator unit, replenishable fuel cell or the like), which is capable of powering IMS 100 and/or re-charging internal batteries thereof for extended durations of time. In some embodiments, power generator 202 serves as a main source of electric power for IMS 100. In alternate embodiments, power generator 202 may be used as a backup power source, which complements on-site sources of electric power.

Those of ordinary skill in the art will appreciate that configurations depicted in FIGS. 1 and 2 may vary. For example, other mechanical, electrical, electronic, optical, or photovoltaic components may be used in addition to or in place of the depicted components and devices. Therefore, the architectures depicted in FIGS. 1 and 2 are basic illustrations of IMS 100 and TIMS 200, for which actual implementations may vary. Thus, the depicted examples are not meant to imply structural or architectural limitations with respect to the present invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. An integrated mounting system for communication/surveillance infrastructures, the system comprising:
   a gantry including (i) a frame configured for housing functional devices of said infrastructures and (ii) a plurality of posts supporting the frame in a pre-selected position;
   a system cabinet containing electronic equipment of the functional devices; and
   a conduit interconnecting the electronic equipment and the functional devices;
   wherein portions of the conduit are disposed in elements of the gantry; and
   wherein the frame comprises a plurality of modules detachably connected to one another and having arms and shoulders that are generally adapted for concealing and protecting branches of the conduit.

2. The system of claim 1, wherein the functional devices include antennas, cameras, sensors and/or photovoltaic panels of communicating, surveillance, and/or solar systems and apparatuses of said infrastructures.

3. The system of claim 1, wherein at least one of the modules comprises a joint coupling allowing rotational movements of portions of said system relative to one another, and after disconnecting a flange between modules, a portion of the gantry including modules and two posts attached thereto may be rotated, about an axis of opposing joint coupling, relative to another portion of the gantry.

4. The system of claim 1, wherein the posts are detachably connected to the frame and the posts comprise sections detachably connected to one another in a fixed or length-adjustable relationship.

5. The system of claim 1, wherein the system cabinet comprises at least one port for cables coupling the system to external sources of electric power and/or land data networks of said infrastructures.

6. The system of claim 1, wherein the system cabinet further contains a cooling unit having a heat-exchanging element adapted for in-ground installation.

7. The system of claim 1, wherein the portions of the conduit and/or a wiring raceway thereof extend from the system cabinet, enter via an entry port into a post of the gantry and propagate through openings in the post and members of one or more modules to reach, via arms and shoulders of the modules, external elements of the electronic equipment, wherein one or more portions of the conduit may extend from the arms and form service loops.

8. The system of claim 1, further including one or more of an internal and an external source of electric power, wherein the external elements include one or more of solar devices, such as photovoltaic panels, wind generators, fuel cells, and other electrical generating elements that can be used as main, supplemental, or backup sources of electric power for components of the electronic equipment.

9. The system of claim 1, further comprising components adapted for providing water tightening of the gantry and/or the system cabinet.

10. The system of claim 1, further comprising components adapted for securing the system cabinet and/or the gantry to supporting foundations thereof.

11. The system of claim 1, further comprising a platform adapted for transporting and/or housing said system.

12. The system of claim 1, wherein the gantry includes: seals, gaskets, and covers adapted for preventing an interior of the gantry from ingress of moisture or water; fixtures preventing unauthorized access to components of electronic equipment; and fixtures preventing climbing on posts, including anti-climbing dishes; and members adapted for securing and stabilizing the gantry.

13. The system of claim 1, wherein components of the electronic equipment and/or the system cabinet are provided with one of radio-frequency identification (RFID) sensors and/or sensors and interlocks traceable via the Global Positioning System (GPS) utilized for monitoring a location of the system and for protecting the electronic equipment from theft or damage.

14. An integrated mounting system for communication/surveillance infrastructures, the system comprising:
    a gantry having (i) a frame configured for housing functional devices including antennas, cameras, sensors and/or photovoltaic panels of communicating, surveillance, and solar systems and apparatuses of said infrastructures and (ii) four posts supporting the frame in a substantially horizontal position;
    a system cabinet containing electronic equipment of the functional devices; and
    a conduit interconnecting the electronic equipment and the functional devices;
    wherein portions of the conduit are disposed in elements of the gantry; and
    wherein the frame comprises a plurality of modules detachably connected to one another and having arms and shoulders that are generally adapted for concealing and protecting branches of the conduit.

15. The system of claim 14, wherein:
    the frame comprises a plurality of modules detachably connected to one another, at least one of said modules having couplings allowing rotational movements of portions of said system relative to one another, wherein after disconnecting a flange between modules, a portion of the gantry including modules and two posts attached thereto may be rotated, about an axis of opposing joint coupling, relative to another portion of the gantry;
    at least a portion of said posts comprises sections detachably connected to one another in a fixed or length-adjustable relationship;
    the system cabinet comprises at least one port for cables coupling the system to external sources of electric power and/or land data networks of said infrastructures;
    the system cabinet contains a cooling unit having a heat-exchanging element adapted for in-ground installation; and portions of the conduit and/or a wiring raceway thereof are disposed in elements of the gantry.

16. The system of claim 15, wherein the portions of the conduit and/or a wiring raceway thereof extend from the system cabinet, enter via an entry port into a post of the gantry and propagate through openings in the post and members of one or more modules to reach, via arms and shoulders of the modules, external elements of the electronic equipment, wherein one or more portions of the conduit may extend from the arms and form service loops.

17. The system of claim 14, further comprising:
   components adapted for providing water tightening of the gantry and the system cabinet;
   components adapted for securing the system cabinet and/or the gantry to supporting foundations thereof; and
   internal or external sources of electric power, wherein the external elements include one or more of solar devices, such as photovoltaic panels, wind generators, fuel cells, and other electrical generating elements that can be used as main, supplemental, or backup sources of electric power for components of the electronic equipment.

18. The system of claim 14, further comprising a platform adapted for transporting and/or housing said system.

19. The system of claim 14, wherein the gantry includes: seals, gaskets, and covers adapted for preventing an interior of the gantry from ingress of moisture or water; fixtures preventing unauthorized access to components of electronic equipment; and fixtures preventing climbing on posts, including anti-climbing dishes; and members adapted for securing and stabilizing the gantry.

20. The system of claim 14, wherein components of the electronic equipment and/or the system cabinet are provided with one of radio-frequency identification (RFID) sensors and/or sensors and interlocks traceable via the Global Positioning System (GPS) utilized for monitoring a location of the system and for protecting the electronic equipment from theft or damage.

* * * * *